Aug. 19, 1941.   R. J. OLANDER   2,252,897
CAR CONSTRUCTION
Filed Oct. 19, 1939
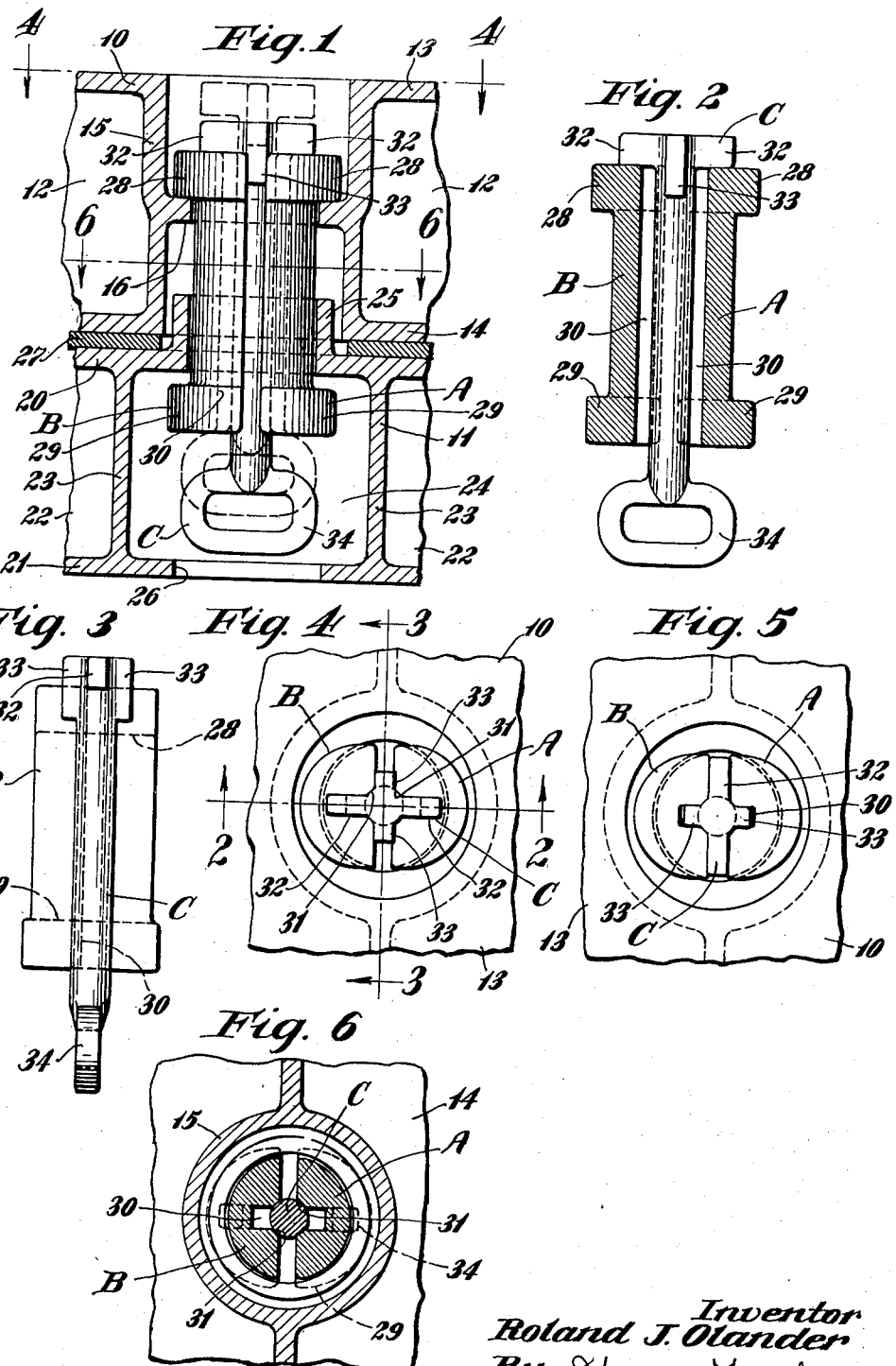
Inventor
Roland J. Olander
By Henry Fuchs
Atty.

Patented Aug. 19, 1941

2,252,897

UNITED STATES PATENT OFFICE 2,252,897

CAR CONSTRUCTION

Roland J. Olander, Chicago, Ill., assignor to W. H. Miner, Inc., Chicago, Ill., a corporation of Delaware Application October 19, 1939, Serial No. 300,223

8 Claims. (Cl. 105—200)

This invention relates to improvements in car construction.

In railway car construction it is common practice to so connect the body and truck bolsters of the car that they cannot be accidentally vertically separated, thereby in the event of collision or derailment preventing or minimizing turning over or telescoping of the car. Locking center pins are now extensively used for this purpose, however, in certain types of cars it is impossible to apply these locking pins from the top of the underframing, and they must therefore be inserted and locked from the underneath side of the truck bolster.

The main object of my invention is to provide an improved car construction, particularly for cars wherein the pin must be applied from underneath the bolster, wherein the pin may be readily inserted and locked from underneath the truck bolster while the car body, including the body bolster, is assembled with the complete truck, and removed when desired, and wherein said pin is in the form of a vertical split member shouldered at opposite ends to lock said bolsters together and held spread apart and in shouldered engagement with the bolsters by an interposed spreading or filler element which is so designed as to be readily locked against accidental removal from the other parts of the pin.

A more specific object of the invention is to provide a locking pin as set forth in the preceding paragraph, wherein the spreading element is insertable between the sections of the split pin from underneath the truck bolster and is held against accidental removal by shouldered engagement with the sections of the split pin.

Another more specific object of the invention is to provide in a three-piece center pin of the character described comprising two outer members and a central filler element, a simple locking means for preventing accidental removal of the filler element comprising wings or lugs at the upper end of said element adapted to pass between the outer members and be brought into overlapping shouldered engagement with the upper ends of said members by partial rotation of the filler element, and further including rigid means on said element engageable between said outer members for locking said element against accidental rotation with respect to the center pin, thereby holding said lugs in operative engaging relation with the upper ends of said outer members.

Other objects of the invention will more clearly appear from the description and claims hereinafter following.

In the drawing forming a part of this specification, Figure 1 is a vertical sectional view, taken lengthwise of the car through the mid portions of the body and truck bolsters of the underframe structure, illustrating my improvements in connection therewith, the center pin being shown in elevation. Figure 2 is a vertical sectional view through the center pin shown in Figure 1, the section corresponding substantially to the line 2—2 of Figure 4. Figure 3 is a view on a plane at right angles to the view shown in Figure 2, the plane of this view corresponding substantially to the line 3—3 of Figure 4, the filler element of said pin being shown in elevation. Figure 4 is a top plan view of Figure 1, as indicated by the line 4—4 in Figure 1. Figure 5 is a view similar to Figure 4, but showing the filler element in a different position. Figure 6 is a horizontal sectional view, corresponding substantially to the line 6—6 of Figure 1.

In said drawing 10 indicates the body bolster of the car and 11 the truck bolster. The body bolster is of the cast type and has diaphragm sections 12—12, top and bottom walls 13 and 14, and a center section 15 to accommodate the center pin. The section 15 is of cylindrical tubular form, as shown, and has an annular inwardly projecting flange 16 between its top and bottom ends, thereby presenting an annular shoulder. The opening defined by this flange is circular and of slightly greater diameter than the shank of the center pin.

The truck bolster 11, which is also preferably a casting, has top and bottom walls 20 and 21, connecting side walls 22—22, and spaced vertical walls 23—23. The spaced walls 23—23 define a pocket 24 therebetween which serves to accommodate the bottom head of the center pin connecting the bolsters. The top wall of the truck bolster is provided with an upstanding hollow boss in the form of an annular flange 25 which projects into and is accommodated within the lower end of the tubular section 15 of the body bolster 10. The opening defined by the flange 25 is in axial alignment with, and corresponds substantially in diameter to, the opening provided by the flange 16 of the tubular section 15 of the bolster 10. The bottom wall 21 of the bolster 11 at the pocket 24 is provided with an opening 26 which is axially aligned with the opening defined by the flange 25, but of somewhat greater diameter than said last named opening. The usual bearing plate or shim 27 is interposed between the body and truck bolsters.

The body bolster is interlocked with the truck bolster by my improved locking center pin which comprises broadly a pair of outer sections A and B and a central combined spreader or filler and locking section C.

The two outer members A and B are of the same design but reversely arranged, as will hereinafter appear. Each outer member is of substantially semi-cylindrical cross section and is provided, at the top thereof, with an eccentric, substantially semi-cylindrical, outstanding flange 28 and with a concentric, substantially semi-cylindrical, outstanding, relatively heavy flange 29 at the bottom thereof. As will be evident, the flanges 28 and 29 form top and bottom head members of the members A and B. The inner face or surface of each outer member is substantially flat and is centrally vertically grooved from end to end, as indicated at 30. As shown, the groove 30 is of angular section, as most clearly illustrated in Figure 6, for a purpose hereinafter described. The outer corners of the side walls of the groove are preferably cut away to present the curved surfaces 31—31 which are concave, and form seats for the corresponding side of the spreader or filler element C. The filler element C is in the form of an elongated cylindrical bar provided with diametrically opposed, laterally projecting lugs 32—32 at its upper end forming a T-shaped head. This head is of such an overall width from side to side of the pin that it will freely pass through the openings of the bolsters. At right angles to the lugs 32—32 the upper end of the cylindrical filler element C is provided with diametrically opposite, laterally projecting wings 33—33 which are shorter than the lugs 32—32 and of greater extent in height than the latter. The lower end edges of these wings 33—33 are at a lower level than the lower edges of the lugs 32—32. The overall dimensions of the wings 33—33 from end to end are such that they pass freely through the grooves 30—30 of the outer members A and B when the latter are spread apart within the bolster openings. It is further pointed out that the upper faces of the lugs 32—32 and the wings 33—33 are in alignment and flush with the upper end of the element C. The shank of the filler element C is of such a length that its bottom end portion protrudes to a considerable extent below the outer members A and B of the pin. Said projecting bottom end portion is provided with a laterally elongated eye portion 34 which serves as a convenient grip for manipulating the filler element and may be engaged by a hook or similar tool to withdraw the filler element from between the outer members of the pin. It is further pointed out that this eye serves as a convenient means by which the filler element may be rotated. This spreader or filler element is of such a diameter that it substantially fills the opening between the curved or concave faces or surfaces 31—31 of the outer members A and B of the center pin and holds these members spread apart to fill the openings in the bolsters.

As will be seen upon reference to Figure 1, when the center pin comprising the outer members A and B and the filler or spreader element C interposed between said members, is applied to the bolsters, the cylindrical shank of the center pin substantially fits the opening defined by the internal flange 16 of the section 15 of the body bolster 10 and the opening defined by the upstanding annular flange or boss 25 of the truck bolster 11, and the flanges 28—28 and 29—29 at the top and bottom ends of the outer sections A and B form enlarged top and bottom head portions which hold the pin against removal from the bolsters. As will be further seen upon reference to Figure 1, the flanges 28—28 at the top ends of the outer sections of the members A and B overlap the annular shoulder provided by the interior flange 16, thereby preventing removal of the pin in a downward direction and the flanges 29—29 at the bottom ends of these sections restrict upward movement of the pin by engagement with the shoulder presented by the top wall of the pocket of the bolster 11.

The eccentric flanges 28—28 at the top ends of the members A and B are of such a size that they will pass freely through the pin receiving openings of both the body and truck bolsters when the filler element C is not present, that is, the top head of each pin is of such a size and outside contour that said heads of the two members will pass freely upwardly through the pin receiving openings of the bolsters as these members are inserted successively, one at a time, from underneath the truck bolster, and will also pass freely downwardly through said openings when these two members are withdrawn in succession.

In applying the center pin to the bolsters, the outer members A and B are first inserted in the pin receiving openings by passing the same, one at a time, and in succession, upwardly through the bolsters, the top flanges clearing the walls of the openings of said bolsters due to the contracted state of the head formed by said flanges. After the top flange of each member has been brought to a position above the level of the shoulder formed by the flange 16 of the tubular section 15 of the bolster 10, and moved laterally outwardly, bringing said top flange 28 and the bottom flange 29 into overhanging relation respectively with the shoulders of the bolsters 10 and 11, the spreader element C is inserted between the members A and B, thus keeping the latter spread apart. The spreader element while being thus inserted is in the position shown in Figure 5 with the lugs 32—32 in alignment with the opening between the flat inner sides of the members A and B, and the wings 33—33 registering with the grooves 30—30 of said members. The spreader C is pushed upwardly to a point where the lower edges of the wings clear the upper ends of the outer members A and B and is then rotated through an arc of 90°, thus bringing the lugs 32—32 into overhanging relation with the heads at the upper ends of said members A and B, as shown in Figure 4, and registering the wings 33—33 with the opening between the flat inner sides of said members. The element C is then permitted to drop downwardly or may be forcibly pulled downwardly until the lugs 32—32 rest on top of the upper ends of the members A and B, thus entering the bottom sections of the wings within the opening between said members. As will be evident, the spreader element C is thus effectively locked against rotation with respect to the outer members A and B, thereby maintaining the lugs 32—32 in position to hold said element C against removal in a downward direction, it being impossible for the element C to rotate back to the position where the lugs 32—32 are aligned with the opening between the outer members A and B of the center pin.

In removing the pin, the operation is substantially the reverse of that just described, the element C being first pushed upwardly until the wings 33—33 clear the upper ends of the members A and B and then rotated through an arc of 90° from the position shown in Figure 4 to that shown in Figure 5 to bring the lugs 32—32 and the wings 33—33, respectively, into registration with the opening between the members A and B and the grooves 30—30 of said members. The spreader or filler element C may then be readily withdrawn in a downward direction from between the members A and B, permitting the latter to be collapsed and withdrawn in succession from the center pin openings of the bolsters.

I have herein shown and described what I now consider the preferred manner of carrying out my invention, but the same is merely illustrative and I contemplate all changes and modifications that come within the scope of the claims appended hereto.

I claim:

1. In car construction, the combination with body and truck bolsters having aligned center pin receiving openings; of a center pin insertable from beneath said truck bolster, said pin including outer members headed at opposite ends and a central filler element between said outer members, said filler element holding the pin expanded with the heads in shouldered engagement with the bolsters; retaining lugs at the upper end of said filler element adapted to pass between said members when the filler element is rotated to a position to align said lugs with the opening between said members; and cooperating locking means on said element and outer members of the pin for locking said filler element and outer members against relative rotation when the lugs are brought into overhanging supported relation with respect to the upper ends of said outer members.

2. In car construction, the combination with body and truck bolsters having aligned center pin receiving openings; of a center pin insertable from beneath said truck bolster, said pin including outer members headed at opposite ends and a central filler element between said outer members, said filler element holding the pin expanded with the heads in shouldered engagement with the bolsters; locking projections on said element adapted to engage between said outer members to lock said element against rotation with respect to said members; and means at the upper end of said element overhanging the upper ends of said members to hold said element against downward displacement, when said locking projections are engaged between said members, the opposed inner sides of said outer members being grooved, and said element being rotatable to register said projections with said grooves, said grooves providing clearance for said projections to permit endwise withdrawal of said element from between said outer members, when said element has been rotated to register the projections with said grooves.

3. In car construction, the combination with body and truck bolsters having aligned center pin receiving openings; of a locking center pin insertable from beneath the truck bolster, said pin including elongated outer members having retaining flanges at opposite ends; a filler element between said members for holding the same spread apart with the flanges thereof in shouldered engagement with the bolsters, said filler element having diametrically oppositely projecting lugs at the upper end adapted to rest on and have shouldered engagement with the top ends of said outer members; and oppositely projecting wings on said element disposed in a diametrical plane at right angles to the plane of said lugs and extending to a level below said lugs between said members to lock the filler element against rotation with respect to said members, said element being rotatable when lifted to disengage said wings from between said outer members to register said lugs with the opening between said outer members, the inner sides of said outer members being longitudinally grooved to provide clearance for said wings when the filler element is in said last named position to permit endwise withdrawal in a downward direction of said element from between said outer members.

4. In a locking pin of the character described, the combination with a pair of elongated outer members having retaining flanges at the top and bottom ends; of an elongated central filler element between said outer members, said filler element having diametrically opposed lugs at the upper end adapted to shoulder on the upper ends of said outer members to hold said element against downward displacement, said filler element being rotatable to bring said lugs into alignment with the opening between said members to permit downward withdrawal of said element from between said outer members, said element having locking wings, clearance being provided between said outer members to permit passage of said wings therebetween lengthwise of said pin when said lugs are in alignment with the opening between said members, said outer members presenting lateral stop faces with which said wings are engaged when said lugs are in said shouldered engagement with said outer members to thereby lock said element against rotation.

5. In a locking pin of the character described, the combination with a pair of elongated outer members having retaining flanges at the top and bottom ends, said members having opposed flat inner faces grooved from end to end at the mid section thereof; of an elongated cylindrical center filler element between said outer members laterally spacing the latter, said filler element having diametrically, oppositely projecting wings and diametrically, oppositely projecting lugs at the upper end, said lugs and wings forming a cross-shaped head, said lugs being of lesser thickness than the space between said outer members to pass between said members, and of greater overall length from one side of said pin to the other than the wings to overhang the upper ends of said outer members at the grooves on the inner faces thereof when said element is turned with the lugs in position at right angles to the space between said members, and the overall length of said wings from side to side of the pin being not greater than the distance between said outer members at said grooved portions thereof to pass through said grooves when aligned therewith, said wings being engaged between the flat faces of said outer members when the lugs are in shouldered engagement with the upper ends of said members to hold said element against rotation.

6. In a locking center pin of the character described, the combination with a pair of elongated outer members having retaining flanges at the top and bottom ends; of an elongated cylindrical center filler element between said members, said filler element having transversely disposed, diametrically, oppositely projecting lugs at the upper end, and diametrically, oppositely projecting wings between said lugs, the overall dimension from the outer end of one of said lugs to the outer end of the opposite lug being less than the diameter of said pin, said wings being shorter than the lugs and depending below the level of said lugs, said outer members being grooved longitudinally from end to end, said grooves being of a depth to provide clearance for said wings when said element is rotated to a position to register said wings with said grooves.

7. In a locking pin for body and truck bolsters of railway cars having aligned center pin receiving openings, the combination with a pair of outer members headed at opposite ends, disposed within said openings, said outer members being spaced apart laterally to provide an opening therebetween; of a central filler element in the opening between said outer members for holding the outer members spread apart, with the heads thereof in shouldered engagement with the bolsters; a head at the upper end of said filler element adapted in one position thereof to overhang the upper ends of said outer members to hold said element against downward displacement; and cooperating interengaging shoulders on said element and outer members for holding said element against rotation when the head is in said position of overhanging relation to the outer members, said shoulders being disengageable from each other by lifting of said element, thereby permitting rotation of the latter, said head and shoulders of said element being of a size to pass between said outer members when said element is rotated from said first named position to a position with the head of said element in registration with the opening between said outer members, thereby permitting said element to pass lengthwise between said outer members.

8. In car construction, the combination with body and truck bolsters having aligned center pin receiving openings; of a center pin insertable from beneath said truck bolster, said pin including outer members headed at opposite ends, and a central filler element between said outer members, said filler element holding the heads of said outer members in shouldered engagement with the bolster; projecting locking means on said filler element; and spaced supporting shoulders for said projecting locking means on said outer members, said means being insertable between said spaced shoulders by displacement of said filler element lengthwise of the pin, said means being movable into engagement over said shoulders by displacement of said means through rotation of said element.

ROLAND J. OLANDER.